United States Patent
Osvog

(10) Patent No.: US 9,994,298 B2
(45) Date of Patent: Jun. 12, 2018

(54) SYSTEM FOR EMBEDDED REMOVABLE APERTURE

(71) Applicant: Andrew J. Osvog, Castaic, CA (US)

(72) Inventor: Andrew J. Osvog, Castaic, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 219 days.

(21) Appl. No.: 14/755,818

(22) Filed: Jun. 30, 2015

(65) Prior Publication Data

US 2017/0001701 A1 Jan. 5, 2017

(51) Int. Cl.
*H01Q 1/28* (2006.01)
*B64C 1/06* (2006.01)
*B64C 3/00* (2006.01)
*B64C 3/18* (2006.01)

(52) U.S. Cl.
CPC ............ *B64C 1/06* (2013.01); *B64C 3/00* (2013.01); *B64C 3/185* (2013.01); *H01Q 1/287* (2013.01); *B64C 2211/00* (2013.01)

(58) Field of Classification Search
CPC .................. H01Q 1/287; G01S 13/9303
See application file for complete search history.

(56) References Cited

U.S. PATENT DOCUMENTS

| | | | |
|---|---|---|---|
| 3,519,228 A * | 7/1970 | Windecker | B64C 3/26 244/123.5 |
| 4,749,997 A * | 6/1988 | Canonico | H01Q 1/287 343/705 |
| 6,653,980 B2 | 11/2003 | Ceccom et al. | |
| 7,182,297 B2 | 2/2007 | Jackson | |
| 7,687,777 B2 | 3/2010 | Norell | |
| 7,810,757 B2 | 10/2010 | Kirkwood | |
| 8,348,196 B2 | 1/2013 | Campana | |
| 2012/0037755 A1 | 2/2012 | Tucker et al. | |
| 2013/0214964 A1 | 8/2013 | Holt | |

* cited by examiner

*Primary Examiner* — Brian M O'Hara
(74) *Attorney, Agent, or Firm* — Baker Botts L.L.P.

(57) ABSTRACT

A system includes a septum sleeve, an aperture fitting, and a removable aperture. The septum sleeve is substantially hollow and is configured to be positioned at least partially within a core of an assembly of an aircraft. The aperture fitting is configured to provide an interface to mechanically fasten the removable aperture. The removable aperture is configured to contain one or more electronic components and to be removably positioned at least partially within the septum sleeve.

17 Claims, 3 Drawing Sheets

SYSTEM FOR EMBEDDED REMOVABLE APERTURE

GOVERNMENT INTEREST

This invention was made with government support under contract number N00019-02-C-3002 awarded by the Department of the Navy. The government may have certain rights in the invention.

TECHNICAL FIELD

This disclosure generally relates to an aperture, and more particularly, to an embedded removable aperture.

BACKGROUND

In some aircraft, electronic components are embedded in an assembly of the aircraft. For example, certain electronic components may be located in an aperture within an aircraft assembly that is located within a wing or the fuselage of an aircraft. Typically, apertures within assemblies of aircraft are permanently fastened and are not easily accessed or removed.

SUMMARY OF EXAMPLE EMBODIMENTS

According to embodiments of the present disclosure, disadvantages and problems associated with previous techniques for embedding electronic components in an assembly of an aircraft may be reduced or eliminated.

In certain embodiments, a system for a removable aperture is disclosed. The system includes a septum sleeve, an aperture fitting, and a removable aperture. The septum sleeve is substantially hollow and is configured to be positioned at least partially within a core of an assembly of an aircraft. The aperture fitting is configured to provide an interface to mechanically fasten the removable aperture. The removable aperture is configured to contain one or more electronic components and to be removably positioned at least partially within the septum sleeve.

Certain embodiments of the present disclosure may provide one or more technical advantages. For example, an advantage of some embodiments may be that an undamaged aperture can be salvaged from a damaged aircraft assembly. As an additional advantage, in the event of an aperture failure, an aircraft assembly can be salvaged and reused by replacing the failed aperture with a new aperture. As another advantage, in the event that electronic equipment within an aperture needs to be upgraded, repaired, or replaced, the aperture in the aircraft assembly may be removed and replaced with an upgraded aperture.

In certain embodiments, placement of the removable aperture within an aircraft assembly may be staged outside of undesirable manufacturing environments. For example, the fabrication of an aircraft assembly may involve processes that are undesirable for the electronics within the aperture. However, certain embodiments of the present disclosure may allow the aircraft assembly to be independently manufactured while the removable aperture can be added later, saving the risk of damage to the components of the removable aperture from the manufacturing environment. In certain embodiments, the fabrication of the aircraft assembly need not require a manufacturing process that is tailored to the sensitivity of the removable aperture.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
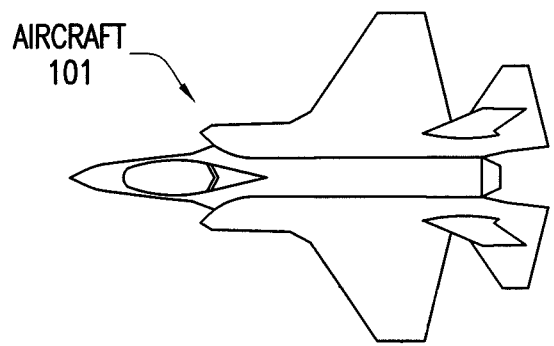
FIG. 1 illustrates an aircraft in which certain embodiments of the disclosure may be utilized.

Embodiments of the present invention and its advantages are best understood by referring to FIGS. 1-5, like numerals being used for like and corresponding parts of the various drawings.

In some aircraft, electronic components are positioned in an assembly of the aircraft. For example, certain electronic components may be located in an aperture within an aircraft assembly that is located in any appropriate portion of an aircraft such as the fuselage or a wing. Typically, apertures within aircraft assemblies are permanently fastened and are not easily accessed or removed. For example, if an aircraft assembly is damaged, an undamaged aperture typically cannot be salvaged and reused because it is permanently embedded within the damaged aircraft assembly. Similarly, when equipment within an aperture fails or needs to be upgraded, the entire aircraft assembly may need to be replaced. In addition, the aperture, which may house sensitive electronic components, may be at risk of damage during the fabrication of the aircraft assembly which may include undesirable environments. Typically, the manufacturing processes may need to be tailored to the sensitivity of the aperture.

The teachings of the disclosure recognize that it is desirable to provide a removable aperture that may be used, for example, in aircraft assemblies. For example, it may be desirable to provide a removable aperture that is utilized in an aircraft assembly that is located in the wing of an airplane to house equipment such as communications equipment. The removable aperture may be easily and quickly removed in order to replace or repair the equipment within the removable aperture, or to replace the removable aperture altogether. The following describes a removable aperture for providing these and other desired benefits.

In general, the disclosed embodiments illustrate a removable aperture that may be utilized in any vehicle such as an aircraft. In one embodiment, a system includes a septum sleeve, an aperture fitting, and a removable aperture. The septum sleeve is substantially hollow and is configured to be positioned at least partially within a core of an aircraft assembly. The aperture fitting is configured to provide an interface to mechanically fasten the removable aperture. The removable aperture is configured to contain one or more electronic components and to be removably positioned at least partially within the septum sleeve and to be fastened to the aperture fitting. In some embodiments, the removable aperture may be configured to be coupled to at least one coaxial cable.

In another embodiment, a system includes a septum sleeve, an aperture fitting, a spar, a removable aperture, a systems plate, and one or more fasteners. The septum sleeve is substantially hollow and is configured to be positioned at least partially within a core of an aircraft assembly such as a wing assembly. At least a portion of the septum sleeve is fastened to at least a portion of the core. The core is configured to be positioned at least partially within a skin of the aircraft assembly. The aperture fitting is configured to provide an interface in which to mechanically fasten the removable aperture and may be fastened to the septum sleeve and/or the core. The spar is configured to line at least a portion of the skin and includes a first lip. The removable aperture is configured to contain one or more electronic components and to be removably positioned at least partially within the septum sleeve. The removable aperture includes a second lip. At least a first portion of the second lip of the removable aperture is configured to be in contact with at least a portion of the first lip of the spar. The systems plate includes a third lip. At least a portion of the third lip of the systems plate is configured to be in contact with at least a second portion of the second lip of the removable aperture. The one or more fasteners are configured to removably fasten the systems plate and the removable aperture to the aperture fitting. For example, one or more fasteners may pass through openings in the third lip of the systems plate, through openings in the second lip of the removable aperture, and into the aperture fitting. In some embodiments, the systems plate may be configured to be coupled to at least one coaxial cable.

The system may include one or more o-rings. A first portion of a first o-ring may be in contact with a portion of the spar, and a second portion of the first o-ring may be in contact with a portion of the second lip of the removable aperture.

FIG. 1 illustrates an aircraft 101 in which certain embodiments of the disclosure may be utilized. For example, certain embodiments may be utilized in a fuselage or a wing of aircraft 101. While aircraft 101 has been illustrated as a certain type of airplane, aircraft 101 may be any form of aircraft such as a helicopter, an unmanned aerial vehicle (UAV), and the like. The disclosed embodiments may also be utilized in any form of vehicle, including, but not limited to, any form of watercraft, land vehicle, or space vehicle. Embodiments of the disclosure are not limited to any particular vehicle or aircraft.

Typically, an aircraft such as aircraft 101 includes various electronic components and equipment used for flight. For example, aircraft 101 may include communications equipment such as an antenna or transmitter. Typically, the equipment is housed in a non-removable aperture that is mounted in a wing or any other appropriate portion of the aircraft. However, embodiments of the disclosure provide a removable aperture (e.g., removable aperture 307 described below) that may be mounted within aircraft 101 or any other aircraft or vehicle in order to house various components and equipment. Certain embodiments of removable aperture 307 are illustrated in FIGS. 3-5.

Figure 2:
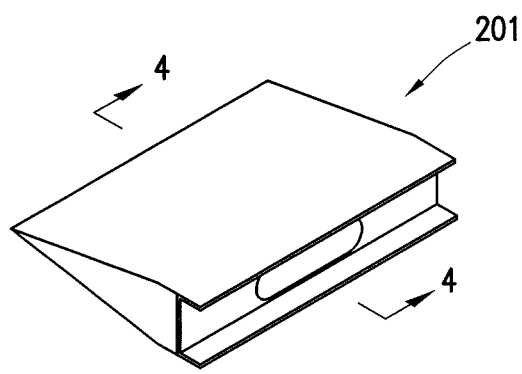
FIG. 2 illustrates a portion of an assembly of the aircraft of FIG. 1 that includes a removable aperture, according to certain embodiments.

FIG. 2 illustrates an aircraft assembly portion 201 for housing a removable aperture 307, according to certain embodiments. As described above, aircraft assembly portion 201 may be located in the fuselage or a wing of aircraft 101, or any other portion of any aircraft or vehicle. FIG. 3 illustrates components of certain embodiments of aircraft assembly portion 201 of FIG. 2 that include removable aperture 307. FIGS. 4 and 5 are cross-sectional views of aircraft assembly portion 201 and removable aperture 307 of FIG. 2, according to certain embodiments.

Figure 3:
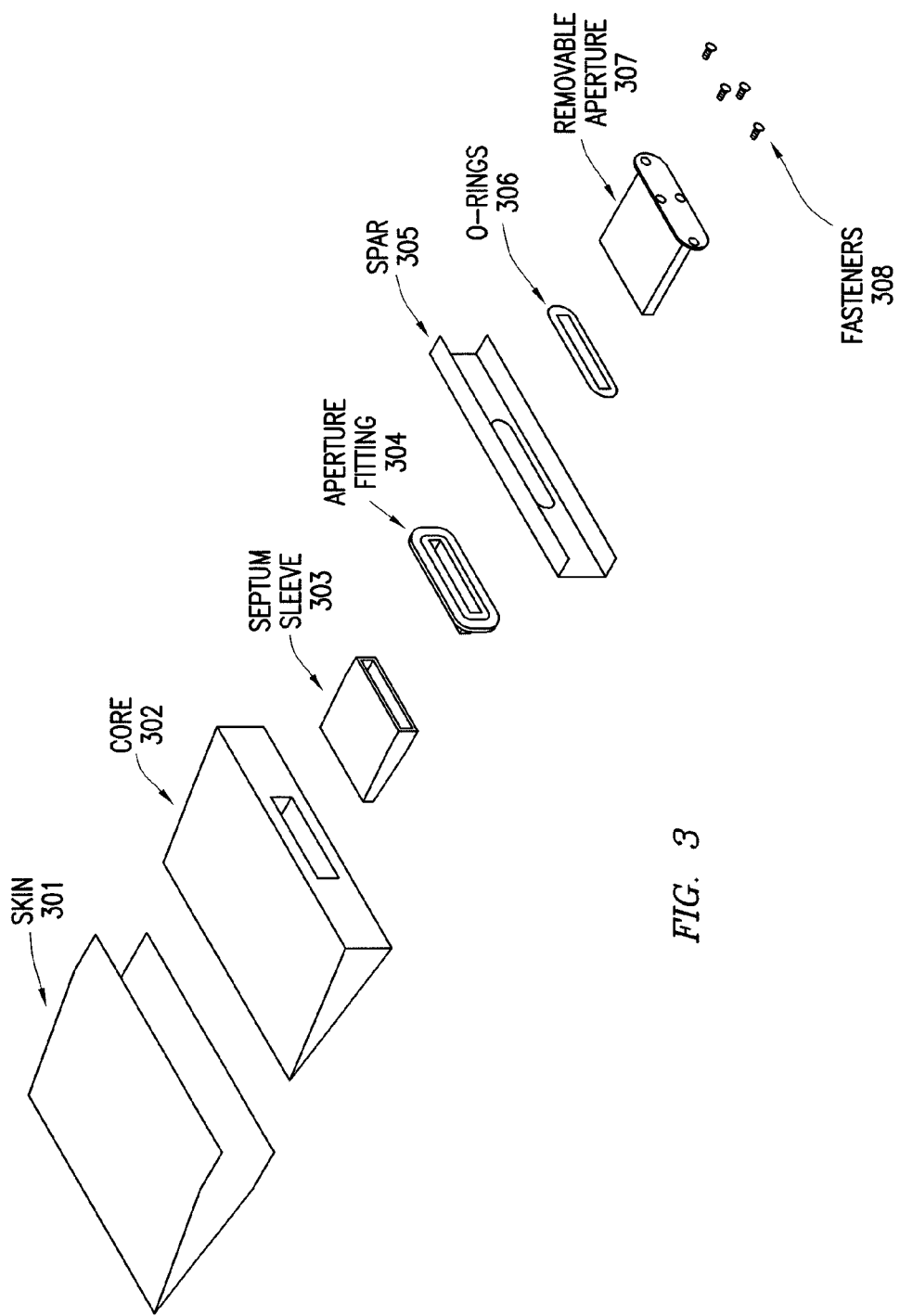
FIG. 3 illustrates components of the assembly and removable aperture of FIG. 2, according to certain embodiments.
Figure 4:
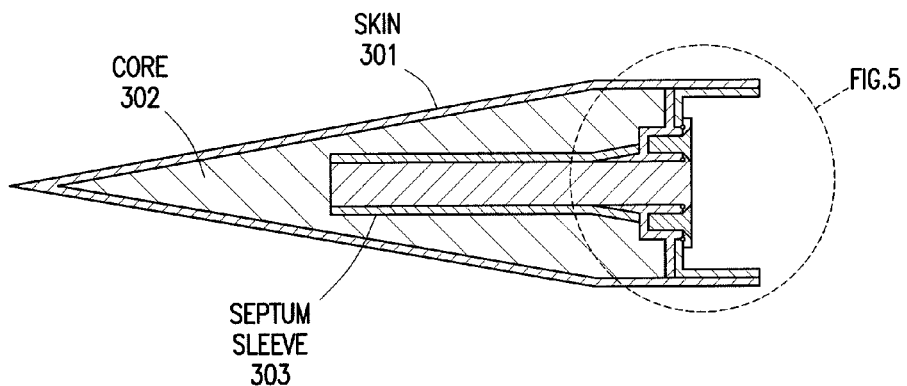
FIG. 4 illustrates a cross-sectional view of the assembly and removable aperture of FIG. 2, according to certain embodiments.
Figure 5:
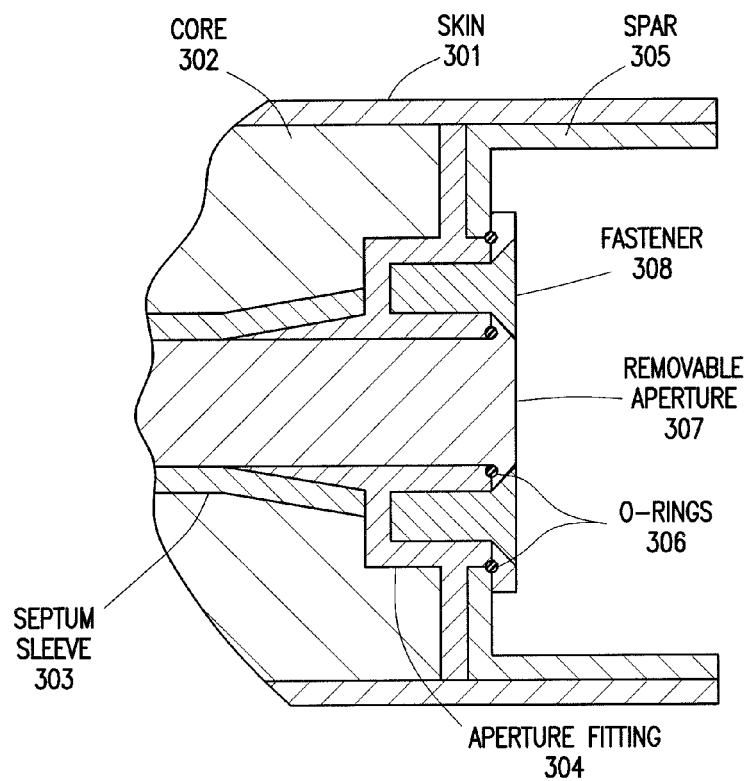
FIG. 5 illustrates a detailed cross-sectional view of a portion of the assembly and removable aperture of FIG. 2, according to certain embodiments.

In reference to FIGS. 3-5, certain embodiments of aircraft assembly portion 201 may include a skin 301, a core 302, a septum. sleeve 303, an aperture fitting 304, a spar 305, o-rings 306, removable aperture 307, and fasteners 308. Septum. sleeve 303 may be positioned at least partially within core 302 . Core 302 may be positioned at least partially within skin 301. Aperture fitting 304 is configured to provide an interface to mechanically fasten removable aperture 307. Removable aperture 307 may be removably positioned at least partially within septum sleeve 303. Fasteners 308 may removably fasten removable aperture 307 to aperture fitting 304. Certain embodiments may additionally include a systems plate and/or one or more coaxial cables (not illustrated). The systems plate may be adjacent to removable aperture 307, may be secured by fasteners 308, and may be coupled to the one or more coaxial cables.

In general, embodiments of the disclosure may be configured to allow for removable aperture 307 to include electronic components and to be removably secured within aircraft assembly portion 201. For example, core 302 may be substantially within skin 301, which may be the outside surface of aircraft assembly portion 201. Spar 305 may line at least a portion of skin 301. Septum sleeve 303 may be substantially within core 302 and may provide a substantially flush fit for removable aperture 307. Aperture fitting 304 may be fastened to septum sleeve 303 and may provide an interface for mechanically fastening removable aperture 307 using fasteners 308 within aircraft assembly portion 201. Removable aperture 307 may be positioned substantially within septum sleeve 303.

In certain embodiments, a systems plate may be placed over removable aperture 307 and may be coupled to one or more coaxial cables for use in conjunction with electronics within removable aperture 307. Certain other embodiments may exclude the systems plate when the removable aperture 307 is coupled directly to one or more coaxial cables. Fasteners 308 may be used to secure removable aperture 307 to aperture fitting 304, thereby removably securing removable aperture 307 within aircraft assembly portion 201. In an alternative embodiment that includes a system plate, fasteners 308 may be used to secure removable aperture 307 and the systems plate to aperture fitting 304.

Skin 301 may be the outer surface of aircraft assembly portion 201. Skin 301 may be made of any suitable material.

Core 302 may be a component of aircraft assembly portion 201 for assisting aircraft assembly portion 201 with maintaining its structural integrity and for housing other components within aircraft assembly portion 201. Core 302 may be configured to be fastened to skin 301. Core 302 may be of any suitable material.

Septum sleeve 303 may be a sleeve that is configured to be positioned substantially within core 302. Septum sleeve 303 may be substantially hollow and may provide a flush surface for interfacing components within septum sleeve 303. As a result, other components may be configured to fit substantially flush with the surface of septum sleeve 303. Septum sleeve 303 may be configured to be fastened substantially within core 302. Septum sleeve 303 may be of any suitable material.

Aperture fitting 304 is configured to provide an interface to mechanically fasten removable aperture 307. Aperture fitting 304 may be configured to be fastened to septum sleeve 303 and/or core 302. Aperture fitting 304 may include threaded inserts and/or threaded features configured to receive fasteners for securing removable aperture 307 within septum sleeve 303. Aperture fitting 304 may be of any suitable material.

Spar 305 may be a component configured to line at least a portion of skin 301. In some embodiments, spar 305 may include a first lip. Spar 305 may be configured to be fastened to skin 301, core 302, and/or aperture fitting 304. Spar 305 may be of any suitable material.

O-rings 306 may be components that are configured to provide a seal between components. O-rings 306 may have a round or any other appropriate cross-sectional shape. O-rings 306 may be designed to be seated in a groove and compressed during assembly between two parts, creating a seal at the interface. O-rings 306 may be made of any suitable material.

Removable aperture 307 may be any component of any shape, size, and material that houses electronic components or other equipment. Removable aperture 307, with its internal components, may be sensitive to manufacturing processes used in manufacturing aircraft assembly portion 201. In addition, removable aperture 307, with its electronic components, may be subject to frequent upgrades or repairs. Such upgrades may outpace upgrades to other components in aircraft assembly portion 201.

Fasteners 308 may be components configured to secure removable aperture 307 to aperture fitting 304. In certain embodiments, fasteners 308 may be configured to pass through openings in removable aperture 307 and may be configured to be secured within threaded inserts of aperture fitting 304. Alternatively, certain embodiments may include a systems plate where fasteners 308 may be configured to secure removable aperture 307 and the systems plate to aperture fitting 304, and may be configured to pass through openings in removable aperture 307 and the systems plate and to be secured within threaded inserts of aperture fitting 304. Fasteners 308 may be any appropriate type of fastener, and any appropriate number of fasteners 308 may be utilized.

In operation, removable aperture 307 may be removably secured within aircraft assembly portion 201 by placing removable aperture 307 substantially within septum sleeve 303 and securing removable aperture 307 to aperture fitting 304 using fasteners 308. Alternatively, certain embodiments may include a systems plate where removable aperture 307 and the systems plate may be secured to aperture fitting 304 using fasteners 308. In certain embodiments, one or more coaxial cables may be coupled to a systems plate or to removable aperture 307 and may be used in conjunction with electronics within removable aperture 307.

When desired, removable aperture 307 may be removed from aircraft assembly portion 201 by removing fasteners 308 and removing removable aperture 307 from septum sleeve 303 or, in certain embodiments that include a systems plate, by removing fasteners 308 and the systems plate and removing removable aperture 307 from septum sleeve 303. Removable aperture 307 may be replaced by a new aperture that may be substantially similar to removable aperture 307, or removable aperture 307 may be removed and then returned once components within removable aperture 307 have been repaired or replaced.

Skin 301 may be fastened to at least a portion of the exterior of core 302 and may provide a surface on the exterior of aircraft assembly portion 201. Septum sleeve 303 may be positioned substantially within core 302. Septum sleeve 303 may be fastened to core 302. Aperture fitting 304 may be fastened to septum sleeve 303, core 302, and/or spar 305. Aperture fitting 304 may include threaded inserts to receive fasteners 308 for securing removable aperture 307 within septum sleeve 303. Spar 305 may line at least a portion of skin 301. Spar 305 may be fastened to skin 301, core 302, and/or aperture fitting 304. Spar 305 may provide a flush surface over portions of aircraft assembly portion 201 for interfacing with removable aperture 307.

In some embodiments, a systems plate may not be included and one or more coaxial cables may be coupled directly to removable aperture 307. In other embodiments, a systems plate may cover the outer end of removable aperture 307. The systems plate may be coupled to one or more coaxial cables for use by aircraft assembly portion 201.

Fasteners 308 may secure removable aperture 307 to aperture fitting 304. In certain embodiments, fasteners 308 may pass through openings in removable aperture 307 and may be secured within threaded inserts of aperture fitting 304. Other types of fasteners or any other suitable mechanism for removably fastening removable aperture 307 may be used. Alternatively, in embodiments that include a system plate, fasteners 308 may pass through removable aperture 307 and the systems plate and may be secured within threaded inserts of aperture fitting 304. The components of FIG. 3 are shown assembled in FIG. 4, which illustrates a cross-sectional view of aircraft assembly portion 201. FIG. 5 illustrates a detailed cross-sectional view of a portion of FIG. 4.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. For example, while certain components herein have been illustrated and described as separate components, certain components may be integrated into a single component in some embodiments. As a specific example, septum sleeve 303 and aperture fitting 304 may be combined into a single integrated component in some embodiments. In such an embodiment, distinct portions of the integrated component may still be referred to as separate components (e.g., portions of the integrated component may still be referred to as septum sleeve 303 and aperture fitting 304). Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a substantially hollow septum sleeve that is configured to be positioned at least partially within a core of an aircraft assembly, the core being configured to be positioned at least partially within a skin of the aircraft assembly;
a removable aperture that is configured to contain one or more electronic components and to be removably positioned at least partially within the septum sleeve, the removable aperture comprising a first lip;
an aperture fitting configured to be coupled to the septum sleeve and the core, the aperture fitting comprising one or more threaded inserts for mechanically fastening the removable aperture;
a spar configured to be coupled to the aperture fitting and the removable aperture, the spar comprising an aperture and a second lip around the aperture, the aperture of the spar comprising a shape configured to permit a portion of the removable aperture to pass through the aperture of the spar and into the substantially hollow septum sleeve; and
one or more fasteners configured to removably fasten the removable aperture to the aperture fitting, thereby confining a portion of the second lip of the spar between the aperture fitting and the first lip of the removable aperture.

2. The system of claim 1, wherein at least one of the one or more fasteners is configured to pass through an opening in the first lip of the removable aperture, and to be removably secured within one of the one or more threaded inserts of the aperture fitting.

3. The system of claim 1, wherein the removable aperture comprises an antenna, the antenna being configured to be coupled to at least one coaxial cable.

4. The system of claim 1, further comprising one or more o-rings, a first portion of a first o-ring of the one or more o-rings being in contact with a portion of the spar and a second portion of the first o-ring being in contact with a portion of the first lip of the removable aperture.

5. The system of claim 1, wherein at least a portion of the septum sleeve is fastened to at least a portion of the core.

6. The system of claim 1, wherein at least a portion of the core is fastened to at least a portion of the skin.

7. The system of claim 1, wherein the substantially hollow septum sleeve is configured to be positioned entirely within the core of the aircraft assembly.

8. The system of claim 1, wherein the removable aperture is configured to slide through the aperture fitting.

9. A system, comprising:
a septum sleeve, the septum sleeve being substantially hollow and being configured to be positioned at least partially within a core of an assembly of an aircraft;
a removable aperture configured to contain one or more electronic components and to be removably positioned at least partially within the septum sleeve;
an aperture fitting configured to provide an interface to mechanically fasten the removable aperture; and
a spar configured to line at least a portion of a skin of the assembly of the aircraft, the spar comprising an aperture, the aperture of the spar comprising a shape configured to permit a portion of the removable aperture to pass through the aperture of the spar;
wherein a portion of the spar is confined between the aperture fitting and a portion of the removable aperture when the removable aperture is installed in the septum sleeve.

10. The system of claim 9, further comprising:
one or more fasteners configured to removably fasten the removable aperture to the aperture fitting;
wherein the aperture fitting is configured to be fastened to the core and the core is configured to be positioned at least partially within the skin.

11. The system of claim 10, wherein at least one of the one or more fasteners is configured to be removably secured within one or more threaded inserts of the aperture fitting.

12. The system of claim 9, wherein the removable aperture comprises an antenna, the antenna being configured to be coupled to at least one coaxial cable.

13. The system of claim 9, wherein at least a portion of the septum sleeve is fastened to at least a portion of the core.

14. An assembly, comprising:
a skin;
a core configured to be positioned substantially within the skin;
a septum sleeve, the septum sleeve being substantially hollow and being configured to be positioned at least partially within the core;
a removable aperture configured to contain one or more electronic components and to be removably positioned at least partially within the septum sleeve;
an aperture fitting configured to provide an interface to mechanically fasten the removable aperture; and
a spar configured to line at least a portion of a skin, the spar comprising an aperture, the aperture of the spar comprising a shape configured to permit a portion of the removable aperture to pass through the aperture of the spar;
wherein a portion of the spar is confined between the aperture fitting and a portion of the removable aperture when the removable aperture is installed in the septum sleeve.

15. The assembly of claim 14, further comprising:
one or more fasteners configured to removably fasten the removable aperture to the aperture fitting;
wherein the aperture fitting is configured to be fastened to the core and the core is configured to be positioned at least partially within the skin.

16. The assembly of claim 15, wherein at least one of the one or more fasteners is configured to be removably secured within one or more threaded inserts of the aperture fitting.

17. The assembly of claim 14, wherein at least a portion of the septum sleeve is fastened to at least a portion of the core.

* * * * *